United States Patent
Doyle et al.

(10) Patent No.: US 7,689,872 B2
(45) Date of Patent: Mar. 30, 2010

(54) AUTONOMIC PROGRAM ERROR DETECTION AND CORRECTION

(75) Inventors: Ronald P. Doyle, Raleigh, NC (US); David Louis Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1833 days.

(21) Appl. No.: 10/612,583

(22) Filed: Jul. 1, 2003

(65) Prior Publication Data

US 2005/0015668 A1 Jan. 20, 2005

(51) Int. Cl.
*G06F 11/00* (2006.01)

(52) U.S. Cl. .......................... 714/48; 714/26
(58) Field of Classification Search ............... 714/26, 714/48
See application file for complete search history.

(56) References Cited

U.S. PATENT DOCUMENTS

| | | | | |
|---|---|---|---|---|
| 4,477,901 A * | 10/1984 | Braband et al. | ............... | 714/46 |
| 4,644,541 A * | 2/1987 | Linkowski | .................. | 714/49 |
| 4,967,337 A * | 10/1990 | English et al. | ................ | 700/79 |
| 5,119,377 A * | 6/1992 | Cobb et al. | .................. | 714/38 |
| 5,463,768 A * | 10/1995 | Cuddihy et al. | ............... | 714/37 |
| 5,495,573 A * | 2/1996 | Datwyler et al. | .............. | 714/48 |
| 5,642,478 A * | 6/1997 | Chen et al. | .................... | 714/45 |
| 5,680,541 A * | 10/1997 | Kurosu et al. | ................. | 714/26 |
| 5,872,909 A * | 2/1999 | Wilner et al. | .................. | 714/38 |
| 6,038,690 A * | 3/2000 | Jacobson et al. | ............. | 714/49 |
| 6,173,418 B1 * | 1/2001 | Fujino et al. | .................. | 714/20 |
| 6,247,149 B1 * | 6/2001 | Falls et al. | .................... | 714/45 |
| 6,324,659 B1 * | 11/2001 | Pierro | .......................... | 714/48 |
| 6,343,236 B1 * | 1/2002 | Gibson et al. | ................. | 700/79 |
| 6,880,107 B1 * | 4/2005 | Kraft, IV | ..................... | 714/36 |

OTHER PUBLICATIONS

*Java Commons Logging bridges gap*, <http://www.zdnet.com.au/printfriendly?AT=2000034779-20272367>, pp. 1-3, (Jun. 2003).

(Continued)

*Primary Examiner*—Robert Beausoliel
*Assistant Examiner*—Elmira Mehrmanesh
(74) *Attorney, Agent, or Firm*—Jeanine S. Ray-Yarlotts, Esq.; Steven M. Greenberg, Esq.; Carey Rodriguez Greenberg & Paul LLP

(57) ABSTRACT

An autonomic system for diagnosing and correcting error conditions among interrelated components and resources. The system can include one or more commonly formatted log files utilizing standardized naming conventions for the interrelated components and resources. Each of the commonly formatted log files can include an association with one of the interrelated components and resources. An autonomic system administrator can be coupled to each of the interrelated components and resources and can be configured to parse the log files to identify both error conditions arising in associated ones of the interrelated components and resources, and also dependent ones of the interrelated components and resources giving rise to the identified error conditions. Preferably, the autonomic system can further include a codebase of analysis code and code insertion logic coupled to the autonomic system administrator and programmed to insert portions of the analysis code in selected ones of the interrelated components and resources.

12 Claims, 3 Drawing Sheets

OTHER PUBLICATIONS

*The AIX Error Logging Facility, Sys Admin the journal for UNIX systems administrators*, pp. 1-4, ttp://www.samag.com/print>, (Jun. 2003).

New PC X Server Tool Brings UNIX and Linux to Every Windows Desktop, *Starnet Communications*, StarNet Press Release Aug. 28, 2002, ttp://www.starnet.com/news/20020828.htm>.

B. Shaddish, Lightening your workload Building on OLE Error-Logging Server, *Fundamental Objects™*, OLE Error Logging Server, pp. 1-11, <http://www.fo.com/artivbl.htm>, (Jun. 2003).

*The Java Community Process(SM) Program—JSRs: Java Specification Requests—detail JSR# 47*, pp. 1-3, <http://web1.jcp.org/en/jsr/detail?id=47&showPrint>, (Jun. 2003).

* cited by examiner

AUTONOMIC PROGRAM ERROR DETECTION AND CORRECTION

BACKGROUND OF THE INVENTION

1. Statement of the Technical Field

The present invention relates to the field of error logging, and more particularly to autonomic application error detection, diagnosis and recovery.

2. Description of the Related Art

Error logging dates from the earliest of computing applications. Error logging, in the context of systems administration, typically involved the monitoring of system state and the continuous writing of log entries to a file, each log entry reflecting an error condition detected within the system. The use of an error log particularly had been necessitated by the complexity of modern computing systems and the speed at which multiple concurrent sub-systems and tasks interact with one another in the system. The system administrator, through inspection of the log entries in the log could diagnose system faults which otherwise would not be apparent by mere observation of the operation of the system.

Traditionally, error logs had been automated only to the extent that log entries could be written to the log automatically as error conditions were detected within the system. The process of reacting to logged error conditions remained manual and human-centric in nature. In many cases, though, the complexity of the system becomes such that a manual review of an error log often can be ineffective in diagnosing the root cause of a fault within the computing system. In any case, as computing matured to include a distributed computing model, the focus of error logging shifted from mere monitoring of conditions within low-level components to conditions surrounding the execution of ordinary computer programs. Consequently, much of the recent research and development arising in the context of error logging pertains to interoperable logging services such as the Java Commons Logging sub-project. From the interoperability perspective, advances reflected with the Java Commons Logging sub-project include a common error logging interface, common error log formats and standardized naming representations for resources.

It will be recognized by the skilled artisan that error logging can be viewed only as a portion of the solution to error processing and management. Specifically, while it can be helpful to automatically log error conditions across multiple applications and system components, the process of reviewing the error log typically occurs only subsequent to an error condition after a period during which the operation of computing system may have failed in its entirety. Conventional error logging facilities fail to undertake remedial measures in response to an error condition logged by the error logging facility. Yet, so many error conditions are not unrecoverable in the sense that many error conditions arise through states which easily can be overcome. Examples include inappropriate user input, insufficient resources, non-responsive or unsupported software, and the like.

Whereas error logging in general can suffice for computing systems geared towards human intervention, the same cannot be said of error logging in the context of autonomic computing. For the uninitiated, autonomic computing systems self-regulate, self-repair and respond to changing conditions, without requiring any conscious effort on the part of the computing system operator. To that end, the computing system itself can bear the responsibility of coping with its own complexity. The crux of autonomic computing relates to eight principal characteristics:

I. The system must "know itself" and include those system components which also possess a system identify.
II. The system must be able to configure and reconfigure itself under varying and unpredictable conditions.
III. The system must never settle for the status quo and the system must always look for ways to optimize its workings.
IV. The system must be self-healing and capable of recovering from routine and extraordinary events that might cause some of its parts to malfunction.
V. The system must be an expert in self-protection.
VI. The system must know its environment and the context surrounding its activity, and act accordingly.
VII. The system must adhere to open standards.
VIII. The system must anticipate the optimized resources needed while keeping its complexity hidden from the user.

In keeping with the principles of autonomic computing, an error logging facility must not only account for the automatic logging of error conditions across an entire system of application components and supporting resources, but also the impact of any one of the logged error conditions must be considered upon the entire computing system. Specifically, it will be of paramount concern to the autonomic system that error conditions which are recoverable are processed as such. Thus, in an autonomic system it is no longer reasonable to log error conditions in the system without regard to autonomic recovery.

SUMMARY OF THE INVENTION

The present invention is a method, system and apparatus for autonomically diagnosis and corrects error conditions in a computing system of interrelated components and resources. The present invention can overcome the deficiencies of conventional error logging and analysis systems and can provide a novel and non-obvious method, system and apparatus not only for identifying the source of an error condition in the computing system, but also for correcting the error condition in the identified source. Significantly, to process complex error conditions arising among the interrelated components and resources, analysis code can be injected into individual ones of the components under study to effectively correlate error conditions in the components which otherwise would not be apparent from a mere review of an error log.

A method for autonomically diagnosing and correcting error conditions in a computing system of interrelated components and resources can include, for each one of the components, reporting error conditions in a log file using both uniform conventions for naming dependent ones of the interrelated components and resources and also a common error reporting format. Error conditions can be detected which arise from individual ones of the interrelated components. Responsive to detecting an error condition in a specific one of the components, a log associated with the specific one of the components can be parsed to determine whether the error condition arose from a fault in one of the interrelated components and resources named in the associated log. A log associated with the one of the interrelated components and resources can be further parsed to identify a cause for the fault.

Once the cause for the fault has been identified, the fault can be corrected. Yet, the interrelated component may have failed based upon a fault within yet another interrelated component or resource. In this regard, in the correcting step, it can be determined from the further parsing step whether the fault in the one of the interrelated components and resources named in the associated log arose from an additional fault in yet another one of the interrelated components and resources.

In this case, each of the parsing and correcting steps can be repeated for the yet another interrelated one the components and resources.

In a preferred aspect of the invention, analysis code can be inserted in the specific one of the components responsive to detecting the error condition. More particularly, the analysis code can be configured to report operational data associated with the error condition. Subsequently, the reported operational data can be used in the identification of the cause for the error condition. In another preferred aspect of the invention, the analysis code can be inserted in both the specific one of the components and the one of the interrelated components and resources responsive to detecting the error condition. In this way, the reported operational data can be used to correlate error conditions in each of the specific one of the components and the one of the interrelated components and resources to identify the cause for the error condition. Finally, in yet another preferred aspect of the invention, the analysis code can be configured to suspend the operation of the specific one of the components pending resolution of the error condition.

An autonomic system for diagnosing and correcting error conditions among interrelated components and resources can include one or more commonly formatted log files utilizing standardized naming conventions for the interrelated components and resources. Each of the commonly formatted log files can include an association with one of the interrelated components and resources. An autonomic system administrator can be coupled to each of the interrelated components and resources. The autonomic system administrator can be configured to parse the log files to identify both error conditions arising in associated ones of the interrelated components and resources, and also dependent ones of the interrelated components and resources giving rise to the identified error conditions. Preferably, the autonomic system can further include a codebase of analysis code and code insertion logic coupled to the autonomic system administrator and programmed to insert portions of the analysis code in selected ones of the interrelated components and resources. In this regard, the analysis code can include byte code and the code insertion logic can include byte code insertion logic.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an autonomic program error detection and correction system. The system can monitor the operation of coupled components in the system, for instance application services, operating system services and computing resources. Each of the coupled components can produce a log of error conditions wherein the log entries are written in a common error format using common resource representations. Upon detecting an error condition in any of the coupled components, the log of the component giving rise to the detected error condition can be inspected to identify the source of the fault. Where the fault has occurred by reference to a dependent component, the log file of the dependent component can be examined to determine the cause of the failure. If the dependent component itself is the root cause of the failure, the system can reset the component, thereby clearing the error condition. Otherwise, where the dependent component has failed by reference to yet another dependency, the process can repeat until the error condition has been cleared.

Figure 1:
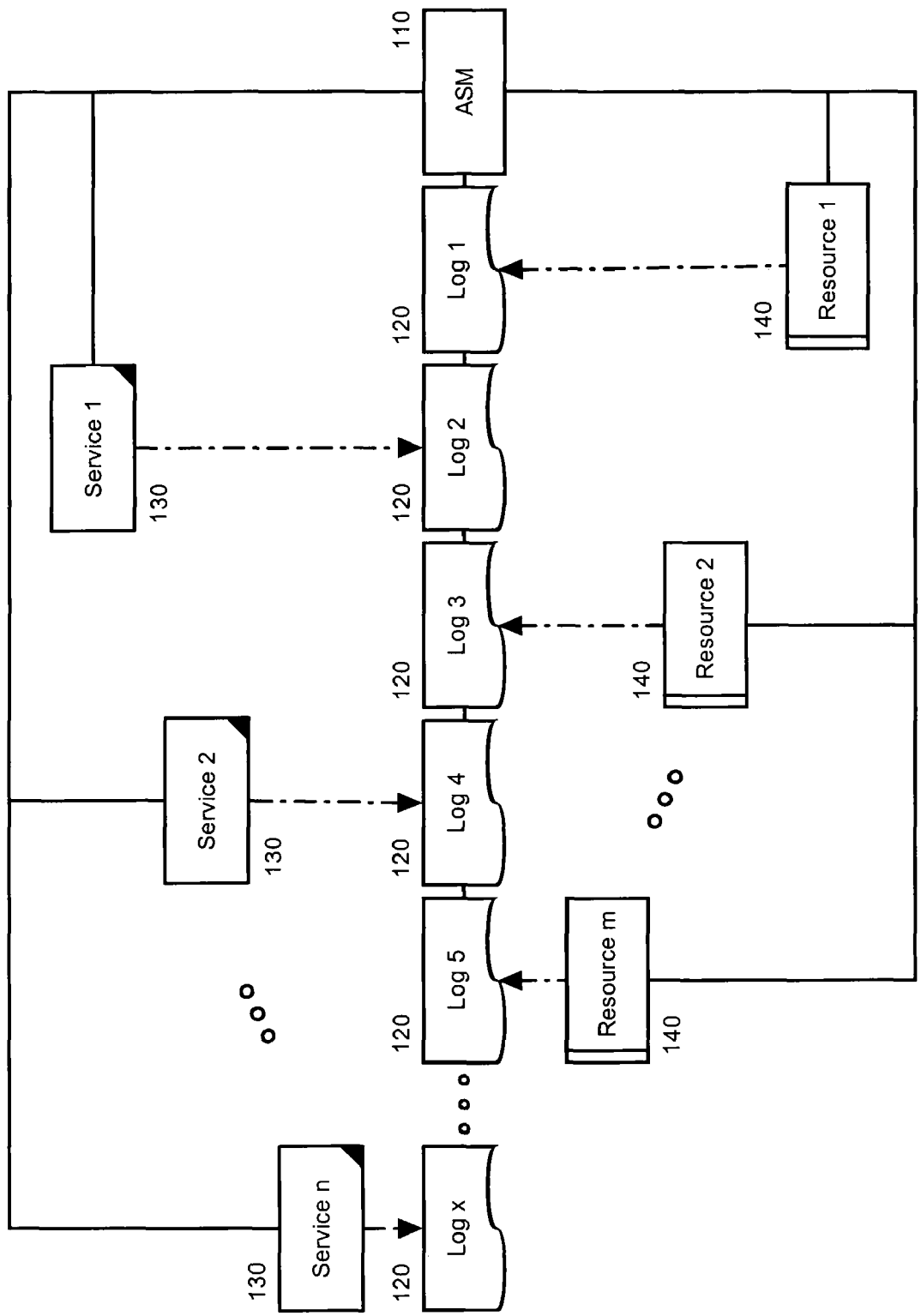
FIG. 1 is a schematic illustration of an autonomic program error detection and correction system which has been configured in accordance with a generalized aspect of the present invention.

FIG. 1 is a schematic illustration of an autonomic program error detection and correction which has been configured in accordance with a generalized aspect of the present invention. The system can include one or more system components 130 coupled to an autonomic system administrator (ASM) 110 configured to monitor the operation of the coupled system components 130. One or more of the system components 130 can be dependent upon on or more other ones of the system components 130. Moreover, one or more of the system components 130 can be dependent upon system resources 140.

It will be recognized by the skilled artisan, that the system resources 140 can range from a database manager which regulates access to a database management system, to a communications controller and is not limited to any specific computing resource. By comparison, the system components 130 can range from application components, including Web services, to operating system components and services. As in the case of the resources 140, the system components 130 are not to be limited to any specific or otherwise narrow element of a computing system so long as the system components 130 can be coupled to the ASM 110 so as to permit the ASM 110 to detect error conditions arising in the operation of both the system components 130 and the resources 140.

Importantly, both the system components 130 and the resources 140 can produce log files 120 during the course of ordinary and anomalous operation. In this regard, each of the system components 130 and the resources 140 can produce entries to a corresponding error log 120. Each entry can be formatted according to a common error format in which all error conditions, regardless of source or nature, are expressed uniformly in a standardized way. Moreover, the identity of the system components 130 and/or resources 140 associated an error condition similarly can be expressed in a standardized way according to a common, known naming representation. It will be recognized by the skilled artisan that several conventional mechanisms exist for such command and standardized error logging, including for instance, the logging interface of the Java standard distribution. Consequently, any other component charged with parsing and interpreting the error log 120 can sufficiently determine the nature and characteristics of an error condition which had arisen in a corresponding one of the system components 130 and the resources 140, regardless of the identity thereof.

In operation, the ASM 110 can monitor the operation of each of the coupled system components 130 and the resources 140. Upon detecting an error condition, the ASM 110 can inspect the log 120 associated with the system component 130 in which the error condition had been detected. From the log 120, it can be determined whether the error condition has arisen from a self-contained fault, such as would be the case where invalid data input has been provided to the system component 130, or whether the error condition has arisen based upon the unexpected behavior of a dependent one of the system components 130 or a dependent one of the resources 140. If the error condition recorded in the log 120 can be related to a self-contained fault, the fault can be resolved either automatically through the default behavior of the system component 130, or through a resetting of the system component 130, for instance by restarting the system component 130.

In contrast, if the error condition recorded in the log 120 can be related to the unexpected behavior of a dependent one of the system components 130 or a dependent one of the resources 140, further analysis and action on the part of the ASM 110 can be warranted. In particular, the identity of the dependency can be ascertained from the log 120 of the failed system component 130 and the log 120 of the dependency can be inspected. Once again, if it can be determined from the log 120 of the dependency that the dependency has failed due to a self-contained fault, the dependency can be reset so as to facilitate the continued operation of the system component 130 which depends upon the dependency. Where it can be determined from the log 120, however, that the fault is the result of yet another dependency, the log 120 of the newly identified dependency can be analyzed and the process can repeat until the fault can be resolved.

Figure 2:
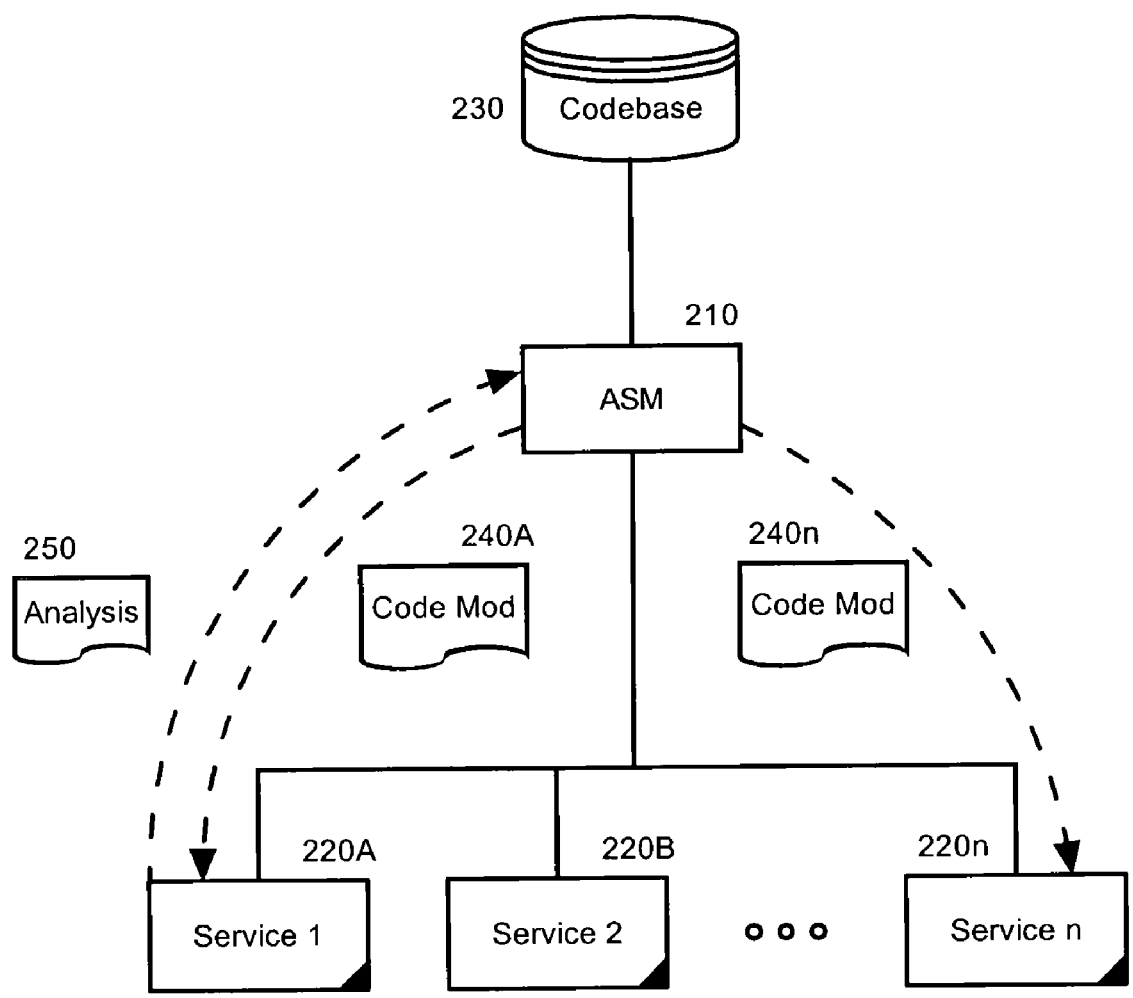
FIG. 2 is a schematic illustration of the autonomic program error detection and correction system of FIG. 1 in which an autonomic system administrator has been configured to insert error management code in coupled system components in accordance with a preferred aspect of the present invention; and, FIG. 3 is a flow chart illustrating a process for correcting an error condition in the autonomic program error detection and correction system of FIG. 1.

Whereas the autonomic program error detection and correction system of FIG. 1 represents a mere generalized aspect of the present invention, in accordance with the present invention, more sophisticated analyses can be applied to diagnose and correct error conditions in one or more system components 130 and associated dependencies. To that end, FIG. 2 is a schematic illustration of the autonomic program error detection and correction system of FIG. 1 in which an autonomic system administrator has been configured to insert error management code in coupled system components in accordance with a preferred aspect of the present invention. Specifically, in a preferred aspect of the present invention, it is presumed that a mere review of an error log will not sufficiently indicate a root cause of a fault in a system component.

Consequently, in the preferred aspect of the invention, the system component affected by the fault and any other failed dependencies can be instrumented with code programmed to analyze the operation of the host component. Referring to FIG. 2, the ASM 210 of the preferred embodiment can be coupled to one or more system components 220A, 220B, 220n. The ASM 210 further can be coupled to a codebase of analysis code 230. The analysis code 230 can include code sufficient for instrumenting the operation of a system component. The instrumentation can include by way of example an inspection and reporting of the instruction register of the system component, CPU usage counts for the system component, and attempts at incoming and outgoing communications with other system components and resources.

Selected ones of the system components 220A, 220B, 220n can be instrumented with the modifications 240A, 240n from the analysis code 230 using conventional dynamic instrumentation techniques, such as JOIE byte code re-writing technology. In this regard, specific portions of the system component 220A, 220B, 220n can be identified from the byte code of the system component. The modifications 240A, 240n in byte code form, can be inserted directly into byte code of the specific portion of the system component 220A, 220B, 220n. Alternatively, pre-existing code in the specific portoin of the system component 220A, 220B, 220n can be activated through byte code modification techniques in this way, during the operation of the component 220A, 220B, 220n, the inserted modifications 240A, 240n.

The execution of the modifications 240A, 240n, in turn, can facilitate a variety of error condition diagnosis and remedial activities. For instance, in the most basic instance, the modification 240A can produce the reporting of operational data 250 for the system component 220A. Using the operational data 250, the ASM 210 can determine whether the fault is a self-contained fault, or the product of a fault within a dependency. Alternatively, in a more advanced implementation, the modification 240n can modify the error handling characteristics of the system component 220n. In this case, the operation of the system component 220n merely can be suspended rather than terminated until such time as the ASM 210 has corrected the fault in a dependency. Such can be accomplished through the use of a listener object in which the subject is the ASM 210 itself.

In further illustration of the foregoing preferred embodiment, consider the circumstance where two system components attempt to access a file which access requires the use of a specific memory block of minimum size. Prior to attempting a lock on the file, one system component can reserve a block of memory of at least the minimum size, leaving an available block of memory which is insufficient to fill any subsequent request for a block of memory of at least the minimum size. Concurrently, the second system component can obtain a lock on the file prior to requesting access to a block of memory of at least the required minimum size. It will be clear to the skilled artisan that a live-lock condition will arise between the two cooperating system components.

In a review of the log for the second of the two components, it will be clear that the component lacks access to a required memory resource. Similarly, a review of the log for the first of the two components will indicate only that access to the requested file has been denied due to a pre-existing lock. To truly diagnose the error condition, both system components will require instrumentation to facilitate the correlation between the inability of the first component to obtain a lock on the file and the inability of the second component to obtain a handle to the required memory. Using this information produced by the instrumentation, the block of memory can be released by the second component and the first component can be suspended until the second component completes its access to the file.

Figure 3:
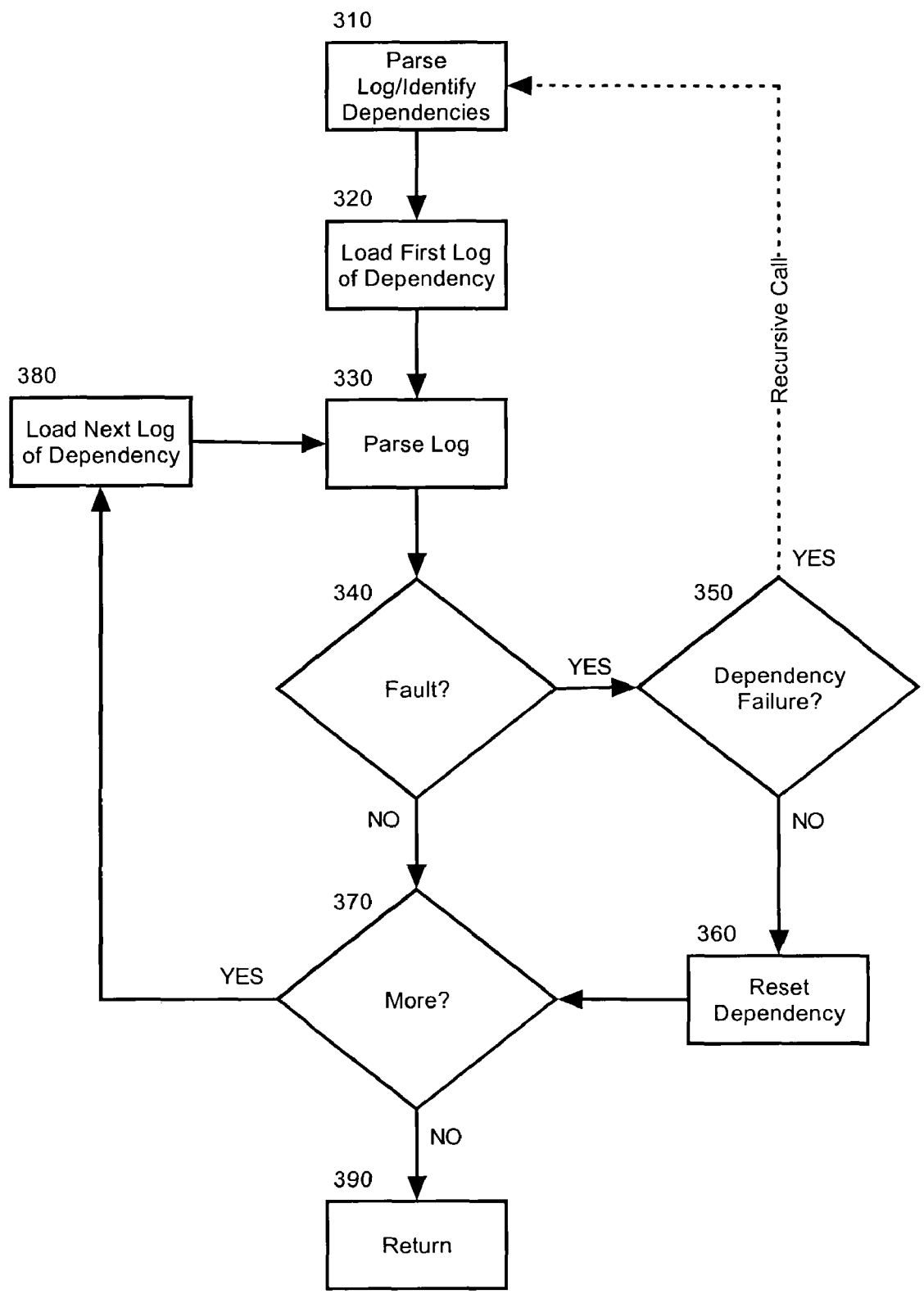

Returning now to the more generalized aspect of the invention, FIG. 3 is a flow chart illustrating a process for correcting an error condition in the autonomic program error detection and correction system of FIG. 1. Beginning in block 310, responsive to detecting an error condition, the log of a component in which a fault has been detected can be parsed to identify dependent components and resources. In block 320, the log of the first identified dependency can be loaded and in block 330 the loaded log can be parsed. Based upon the data uniformly reported in the loaded log, the source of the failure, if any, within the dependency can be determined.

In decision block 340, if no fault is detected within the first dependency, in decision block 370 it can be determined if any further dependencies remain to be analyzed. If so, in block 380 the log of the next dependency can be loaded and the process can repeat through blocks 330 through 370. Notably, if in decision block 340 a fault is determined from the log of the dependency under study, in decision block 350 it can be determined from the log whether the fault has arisen from the self-contained operation of the dependency, such as a data input error, or whether the fault has arisen through the reliance upon another dependent component or resource. If the fault is determined to be self-contained, in block 360 the dependency can be reset so as to clear the fault. Otherwise, the process of blocks 310 through 390 can be recursively repeated so as to resolve the fault within the dependency of the dependency under study.

It will be recognized by the skilled artisan that as a result of the systematic analysis of common resource representations and the standardized reporting of error conditions within a log file, a correlation between error cases in different interrelated system components and resources can be established. Through this correlation, recovery actions can be coordinated so as to facilitate the continued operation of the system in an autonomic manner. Accordingly, the eight principal characteristics of an autonomic system can be met so that the computing system itself can bear the responsibility of coping with its own complexity.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for autonomically diagnosing and correcting error conditions in a computing system of interrelated components and resources, the method comprising the steps:
   for each one of the components, reporting error conditions in a log file using both uniform conventions for naming dependent ones of the interrelated components and resources and also a common error reporting format;
   detecting error conditions arising from individual ones of the interrelated components;
   responsive to detecting an error condition in a specific one of the components, parsing a log associated with said specific one of the components to determine whether said error condition arose from a fault in one of the interrelated components and resources named in said associated log, and further parsing a log associated with said one of the interrelated components and resources to identify a cause for said fault; and,
   correcting said fault.

2. The method of claim 1, further comprising the steps of:
   inserting analysis code in said specific one of the components responsive to detecting said error condition, said analysis-code having a configuration for reporting operational data associated with said error condition; and,
   utilizing said reported operational data to identify a cause for said error condition.

3. The method of claim 1, further comprising the steps of:
   activating dormant analysis code in said specific one of the components responsive to detecting said error condition, said dormant analysis code having a configuration for reporting operational data associated with said error condition; and,
   utilizing said reported operational data to identify a cause for said error condition.

4. The method of claim 1, further comprising the steps of:
   inserting analysis code in both said specific one of the components and said one of the interrelated components and resources responsive to detecting said error condition, said analysis code having a configuration for reporting operational data for said specific one of the components and said one of the interrelated components and resources; and,
   utilizing said reported operational data to correlate error conditions in each of said specific one of the components and said one of the interrelated components and resources to identify a cause for said error condition.

5. The method of claim 1, further comprising the step of inserting analysis code in said specific one of the components responsive to detecting said error condition, said analysis code having a configuration for suspending the operation of said specific one of the components pending resolution of said error condition.

6. The method of claim 1, wherein said correcting step comprises the steps of:
   determining from said further parsing step whether said fault in said one of the interrelated components and resources named in said associated log arose from an additional fault in yet another one of the interrelated components and resources; and,
   repeating each of the parsing and correcting steps for said yet another interrelated one the components and resources.

7. A machine readable storage having stored thereon a computer program for autonomically diagnosing and correcting error conditions in a computing system of interrelated components and resources, the computer program comprising a routine set of instructions for causing the machine to perform the steps:
   for each one of the components, reporting error conditions in a log file using both uniform conventions for naming dependent ones of the interrelated components and resources and also a common error reporting format;
   detecting error conditions arising from individual ones of the interrelated components;
   responsive to detecting an error condition in a specific one of the components, parsing a log associated with said specific one of the components to determine whether said error condition arose from a fault in one of the interrelated components and resources named in said associated log, and further parsing a log associated with said one of the interrelated components and resources to identify a cause for said fault; and,
   correcting said fault.

8. The machine readable storage of claim 7, further comprising the steps of:
   inserting analysis code in said specific one of the components responsive to detecting said error condition, said analysis code having a configuration for reporting operational data associated with said error condition; and, utilizing said reported operational data to identify a cause for said error condition.

9. The machine readable storage of claim 7, further comprising the steps of:

activating dormant analysis code in said specific one of the components responsive to detecting said error condition, said dormant analysis code having a configuration for reporting operational data associated with said error condition; and, utilizing said reported operational data to identify a cause for said error condition.

10. The machine readable storage of claim 7, further comprising the steps of:

inserting analysis code in both said specific one of the components and said one of the interrelated components and resources responsive to detecting said error condition, said analysis code having a configuration for reporting operational data for said specific one of the components and said one of the interrelated components and resources; and, utilizing said reported operational data to correlate error conditions in each of said specific one of the components and said one of the interrelated components and resources to identify a cause for said error condition.

11. The machine readable storage of claim 7, further comprising the step of inserting analysis code in said specific one of the components responsive to detecting said error condition, said analysis code having a configuration for suspending the operation of said specific one of the components pending resolution of said error condition.

12. The machine readable storage of claim 7, wherein said correcting step comprises the steps of:

determining from said further parsing step whether said fault in said one of the interrelated components and resources named in said associated log arose from an additional fault in yet another one of the interrelated components and resources; and, repeating each of the parsing and correcting steps for said yet another interrelated one the components and resources.

* * * * *